（12） United States Patent
Morishita et al.

(10) Patent No.: US 9,077,224 B2
(45) Date of Patent: Jul. 7, 2015

(54) ROTOR CORE, ROTOR, AND ROTATING ELECTRIC MACHINE

(71) Applicant: KABUSHIKI KAISHA YASKAWA DENKI, Kitakyushu-shi (JP)

(72) Inventors: Daisuke Morishita, Kitakyushu (JP); Yuki Ochiai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 93 days.

(21) Appl. No.: 13/669,450

(22) Filed: Nov. 6, 2012

(65) Prior Publication Data

US 2013/0113326 A1 May 9, 2013

Related U.S. Application Data

(60) Provisional application No. 61/565,510, filed on Dec. 1, 2011.

(30) Foreign Application Priority Data

| Nov. 8, 2011 | (JP) | ................................. 2011-244621 |
| Nov. 8, 2011 | (JP) | ................................. 2011-244622 |
| Nov. 30, 2011 | (JP) | ................................. 2011-262362 |

(51) Int. Cl.
*H02K 1/27* (2006.01)

(52) U.S. Cl.
CPC .............. *H02K 1/274* (2013.01); *H02K 1/2766* (2013.01)

(58) Field of Classification Search
CPC ............................... H02K 1/27; H02K 1/2706
USPC ............ 310/156.09, 156.19, 156.36–156.38, 310/156.43, 156.45, 156.47–156.49, 310/156.53, 156.55–156.57, 216.008, 310/216.011, 216.013, 216.016, 216.096
See application file for complete search history.

(56) References Cited

U.S. PATENT DOCUMENTS

| 6,525,442 B2 * | 2/2003 | Koharagi et al. ........ 310/156.48 |
| 6,917,133 B2 * | 7/2005 | Koharagi et al. ........ 310/156.57 |
| 7,808,143 B2 * | 10/2010 | Lee et al. ................. 310/156.53 |
| 8,598,763 B2 * | 12/2013 | Aota et al. ............... 310/156.57 |

(Continued)

FOREIGN PATENT DOCUMENTS

| CN | 101272066 | 9/2008 |
| CN | 100581026 C | 1/2010 |

(Continued)

OTHER PUBLICATIONS

Japanese Office Action for corresponding JP Application No. 2011-244622, Apr. 24, 2012 (re-listed with corrected application number).

(Continued)

*Primary Examiner* — Naishadh Desai
(74) *Attorney, Agent, or Firm* — Mori & Ward, LLP

(57) ABSTRACT

A rotor core according to an embodiment has a plurality of magnet openings and cavity portions. The magnet openings are in juxtaposition with each other in a circumferential direction. Permanent magnets are inserted in the magnet openings. The cavity portions are each formed relative to an area sandwiched between two magnet openings, out of the magnet openings, in which the permanent magnets that are mutually adjacent and that have magnetic pole directions relative to a radial direction opposite to each other are inserted.

7 Claims, 12 Drawing Sheets

(56) References Cited

U.S. PATENT DOCUMENTS

| | | | |
|---|---|---|---|
| 2007/0057589 A1* | 3/2007 | Tatematsu et al. | 310/156.53 |
| 2007/0063607 A1* | 3/2007 | Hattori | 310/156.53 |
| 2008/0007131 A1* | 1/2008 | Cai et al. | 310/156.38 |
| 2008/0231135 A1* | 9/2008 | Suzuki et al. | 310/156.53 |

FOREIGN PATENT DOCUMENTS

| | | |
|---|---|---|
| JP | 09-009537 | 1/1997 |
| JP | 2003-143788 | 5/2003 |
| JP | 2005-039963 | 2/2005 |
| JP | 2008-199846 | 8/2008 |
| JP | 2009-022144 | 1/2009 |
| JP | 2009-112166 | 5/2009 |
| JP | 2010-178535 | 8/2010 |

OTHER PUBLICATIONS

Japanese Office Action for corresponding JP Application No. 2011-244622, Jan. 4, 2012 (re-listed with corrected application number).

Japanese Office Action for corresponding JP Application No. 2011-244621, Jan. 4, 2012.

Japanese Office Action for corresponding JP Application No. 2011-262362, Jan. 4, 2012.

Japanese Office Action for corresponding JP Application No. 2012-244622, Apr. 24, 2012.

Japanese Office Action for corresponding JP Application No. 2012-244622, Jan. 4, 2012.

Chinese Office Action for corresponding CN Application No. 201210438856.8, Aug. 22, 2014.

Chinese Office Action for corresponding CN Application No. 201210438856.8, Feb. 17, 2015.

* cited by examiner

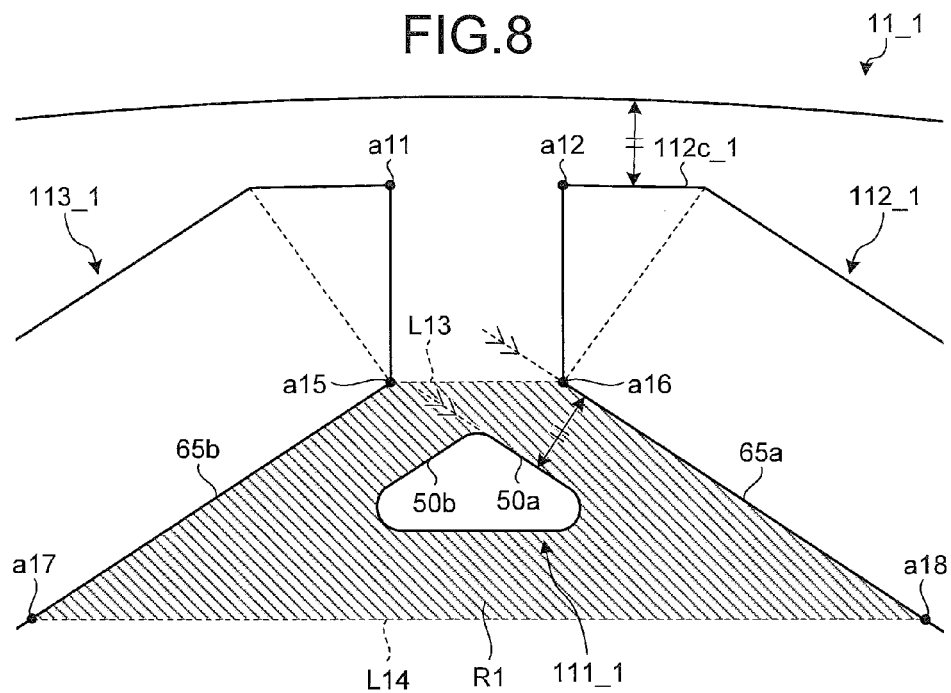
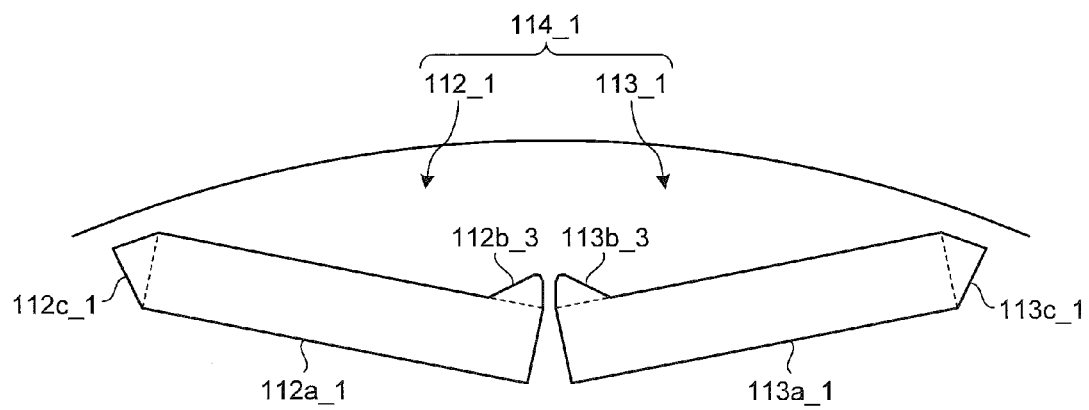

ROTOR CORE, ROTOR, AND ROTATING ELECTRIC MACHINE

CROSS-REFERENCE TO RELATED APPLICATIONS

This application is based upon and claims the benefit of priority of the prior Japanese Patent Application No. 2011-244621, filed on Nov. 8, 2011; Japanese Patent Application No. 2011-244622, filed on Nov. 8, 2011; Japanese Patent Application No. 2011-262362, filed on Nov. 30, 2011; and U.S. Provisional Application No. 61/565,510, filed on Dec. 1, 2011; the entire contents of all of which are incorporated herein by reference.

FIELD

The embodiments discussed herein are directed to a rotor core, a rotor, and a rotating electric machine.

BACKGROUND

Permanent magnet rotating electric machines are known as rotating electric machines, such as electric motors and generators. The permanent magnet rotating electric machine includes a rotor having a plurality of permanent magnets arranged in a circumferential direction of a rotor core and a stator disposed so as to face an outer peripheral surface of the rotor with an air gap defined therebetween.

The rotating electric machines of this type include a surface permanent magnet (SPM) rotating electric machine having a permanent magnet disposed relative to an outer peripheral surface of the rotor core and an interior permanent magnet (IPM) rotating electric machine having a permanent magnet embedded in an inside of the rotor core. The IPM rotating electric machine is widely used particularly in the field of, for example, machine tools, electric vehicles, and robots.

SUMMARY

A rotor core according to one aspect of the present invention has a plurality of magnet openings and cavity portions. The magnet openings are in juxtaposition with each other in a circumferential direction. Permanent magnets are inserted in the magnet openings. The cavity portions are each formed relative to an area sandwiched between two magnet openings, out of the magnet openings, in which the permanent magnets that are mutually adjacent and that have magnetic pole directions relative to the radial direction opposite to each other are inserted.

BRIEF DESCRIPTION OF DRAWINGS

More complete understanding of the present invention and attendant advantages thereto will be more readily achieved by considering the following detailed description in conjunction with the accompanying drawings, wherein:

FIG. 8 is an enlarged schematic view illustrating parts around a cavity portion;

FIG. 9 is a schematic view illustrating an arrangement of magnet opening portions;

DESCRIPTION OF EMBODIMENTS

A rotor core, a rotor, and a rotating electric machine according to preferred embodiments disclosed in the application will be described in detail below with reference to the accompanying drawings. It is to be noted that the embodiments to be described hereunder are not intended to limit the present invention. For example, though the rotating electric machine disclosed in the application will be described for an exemplary motor, the rotating electric machine disclosed in the application may, for example, be a generator.

First Embodiment

Figure 1:
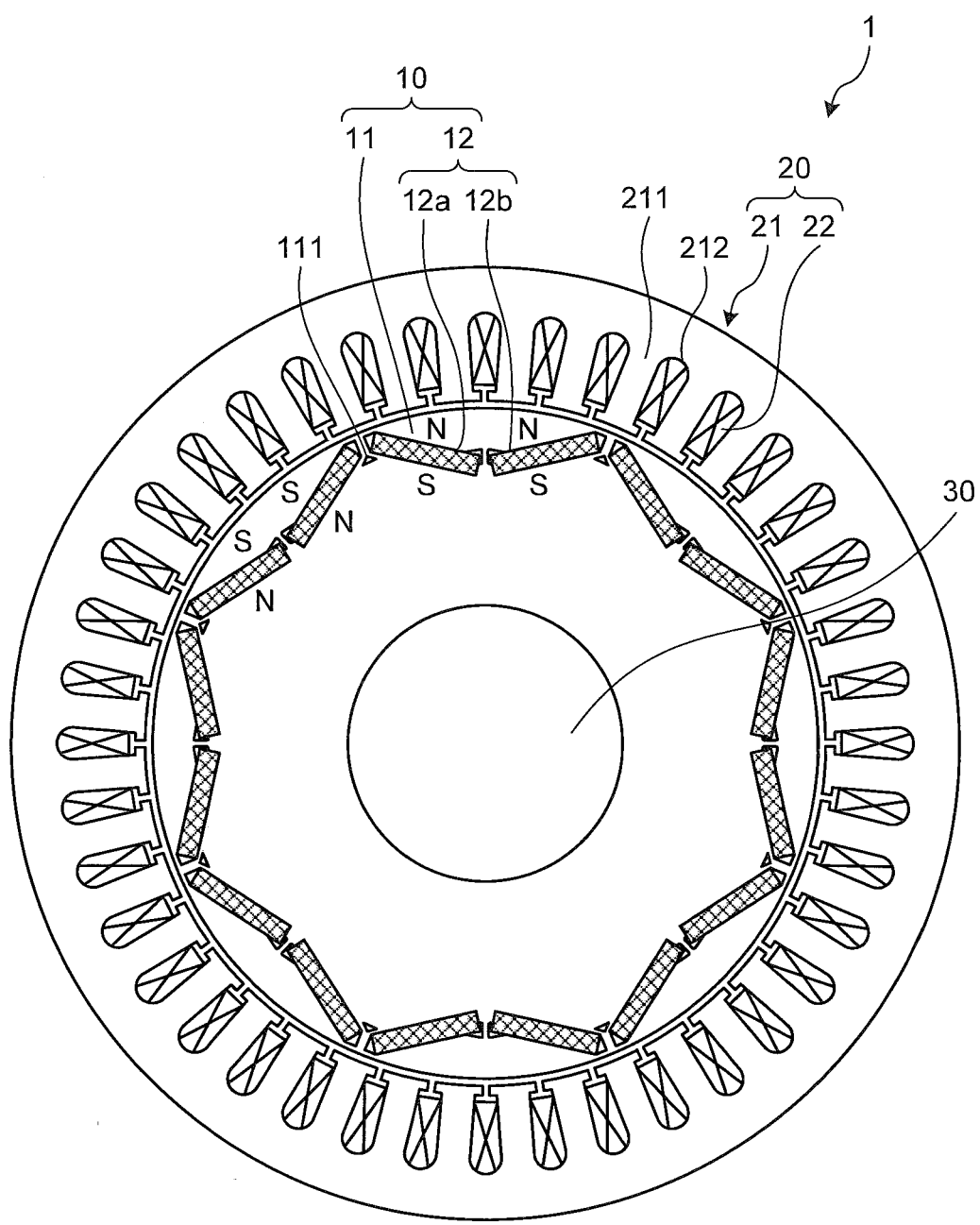
FIG. 1 is a schematic view illustrating a motor according to a first embodiment as viewed from an axial direction of a shaft.

An arrangement of a motor according to a first embodiment will be described below with reference to FIG. 1. FIG. 1 is a schematic view illustrating the motor according to the first embodiment as viewed from an axial direction of a shaft. Referring to FIG. 1, a motor 1 according to the first embodiment includes a rotor 10, a stator 20, and a shaft 30.

The rotor 10 includes a rotor core 11 and permanent magnets 12. The rotor core 11 is a cylindrical member (a laminate of electrical steel sheets) formed of a large number of thin sheets (electrical steel sheet forming bodies), such as electrical steel sheets, laminated together. The permanent magnets 12 are disposed in a circumferential direction inside the rotor core 11. The rotor 10 is mounted on the shaft 30 so as to be rotatable about the shaft 30 as a central axis.

The stator 20 is disposed so as to face an outer peripheral surface of the rotor 10 with an air gap defined therebetween. The stator 20 includes a stator core 21 and a stator winding 22.

The stator core 21 is a substantially cylindrical member having a large number of teeth 211 on the inner peripheral side, each protruding inwardly in a radial direction, formed along the circumferential direction. A space between the teeth 211 is called a slot 212. The stator winding 22 wound using an insulation-coated wire is housed inside each slot 212. It is noted that the stator winding 22 is to be wound by distributed winding; however, the stator winding 22 may still be wound by concentrated winding.

A rotating magnetic field is generated on the inside of the stator 20 when current flows through the stator winding 22 of the stator 20. The rotating magnetic field, and a magnetic field generated by the permanent magnets 12 of the rotor 10 mutually act to rotate the rotor 10. The rotation of the rotor 10 causes the shaft 30 to rotate therewith.

In the motor 1 according to the first embodiment, the permanent magnet 12 that constitutes a single pole includes a first magnet 12a and a second magnet 12b. The first magnet 12a and the second magnet 12b have a magnetic pole direction relative to the radial direction identical to each other and are disposed such that the space therebetween forms a V shape that widens toward the outer peripheral side of the rotor core 11.

For example, referring to FIG. 1, if the first magnet 12a is disposed such that its N pole is on the outer peripheral side, the second magnet 12b that is paired with the first magnet 12a is also disposed such that its N pole is on the outer peripheral side.

The permanent magnets 12 adjacent to each other are disposed such that the magnetic pole direction relative to the radial direction is opposite to each other. For example, referring to FIG. 1, a permanent magnet 12 including a first magnet 12a and a second magnet 12b having an N pole facing the rotation center side is disposed adjacent to a corresponding one of the first magnet 12a and the second magnet 12b having an N pole facing the outer peripheral side.

It is here noted that, in the related-art rotating electric machine, the permanent magnet can be demagnetized by an opposing magnetic field from the stator as a result of, for example, an armature reaction. Demagnetization of a permanent magnet refers to a reduction in residual magnetic flux of the permanent magnet. Such demagnetization of the permanent magnet can be a cause of degraded performance of the rotating electric machine.

The motor 1 according to the first embodiment therefore has a predetermined air gap in areas around portions of the permanent magnets 12 where the demagnetization tends to occur. Specifically, portions in which the permanent magnets 12 are not to be inserted (second opening portions 112b, 113b to be described later) are formed relative to magnet openings formed in the rotor core 11 for inserting therein the permanent magnets 12. This helps make the demagnetization of the permanent magnets 12 hard to occur even if the opposing magnetic field from the stator is produced.

Magnetic flux leakage from between the permanent magnets could occur in the related-art rotating electric machine. When such magnetic flux leakage occurs, an effective flux contributing to an output of the rotating electric machine is decreased by the flux leakage, resulting in a reduced output of the rotating electric machine. The motor 1 thus has a cavity portion 111 relative to an area sandwiched between the adjacent permanent magnets 12. As a result, an air layer having a low permeability is interposed in a magnetic path of the leaky magnetic flux, so that the magnetic flux leakage can be reduced. This will be described later with reference to a second embodiment.

Figure 2:
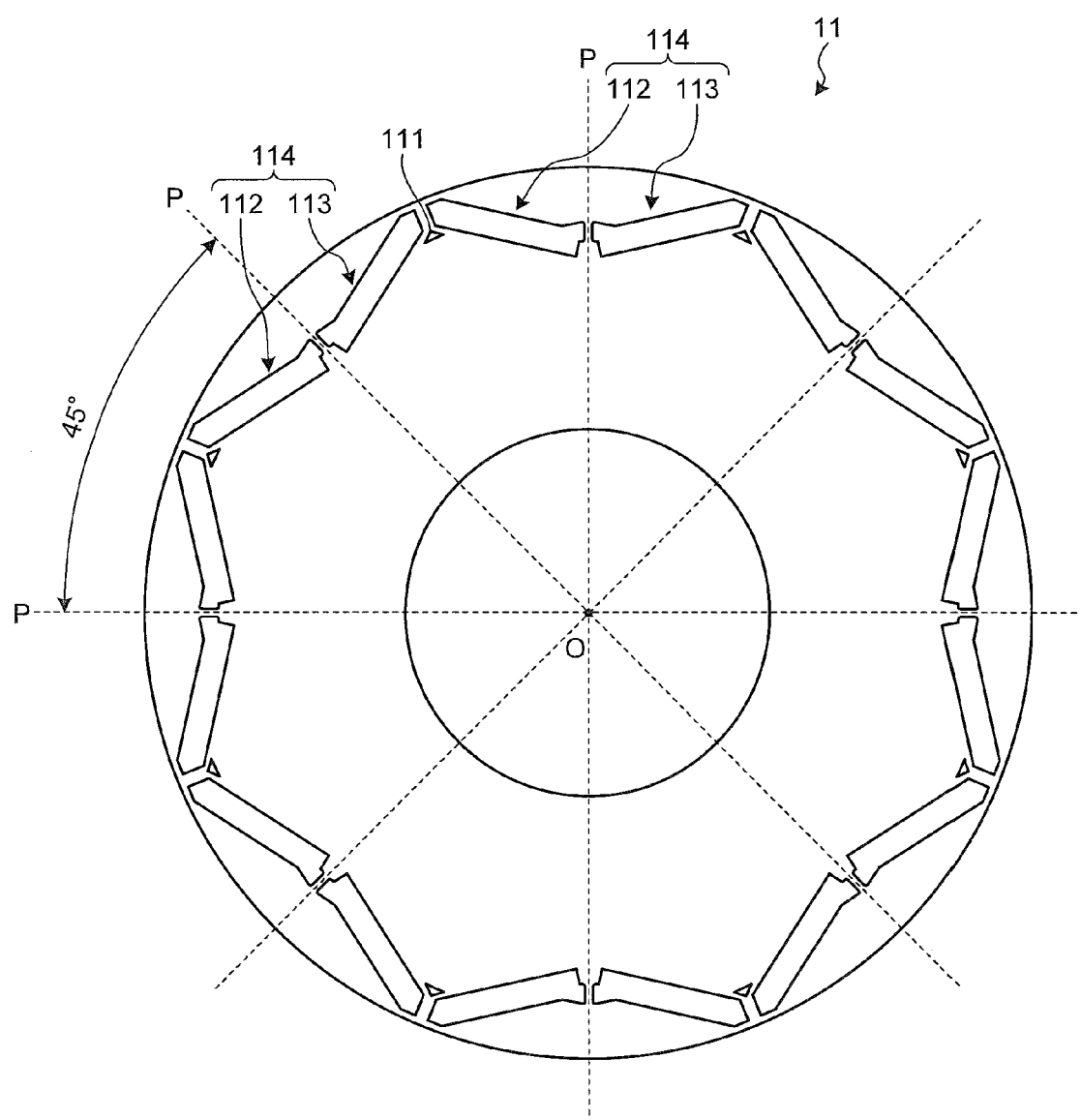
FIG. 2 is a schematic view illustrating an arrangement of a rotor core according to the first embodiment.

An arrangement of the rotor core 11 will be specifically described below. FIG. 2 is a schematic view illustrating an arrangement of the rotor core 11 according to the first embodiment.

Referring to FIG. 2, the rotor core 11 has magnet opening portions 114 formed in juxtaposition with each other in the circumferential direction, each of the magnet opening portions 114 including a set of a first magnet opening 112 and a second magnet opening 113. Each of the magnet opening portions 114 is disposed such that the first magnet opening 112 and the second magnet opening 113 are symmetrical to each other about a polar pitch line P placed at a polar pitch angle of 45 degrees.

The first magnet opening 112 is an opening in which the first magnet 12a (see FIG. 1) is to be inserted. The second magnet opening 113 is an opening in which the second magnet 12b (see FIG. 1) is to be inserted. The first magnet opening 112 and the second magnet opening 113 are disposed such that the space therebetween forms a V shape that widens toward the outer peripheral side.

An exemplary arrangement is here described in which eight sets of magnet opening portions 114 are formed in the rotor core 11; however, the number of sets of magnet opening portions 114 formed in the rotor core 11 is not limited to eight.

Figure 3:
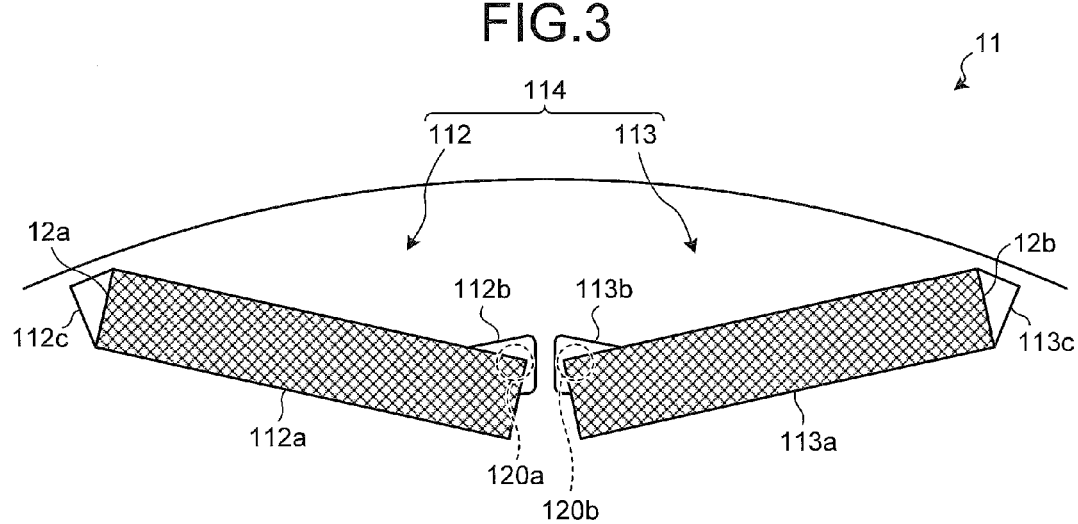
FIG. 3 is an enlarged view illustrating parts around a magnet opening portion illustrated in FIG. 2.

An arrangement of the magnet opening portion 114 will be specifically described below with reference to FIG. 3. FIG. 3 is an enlarged view illustrating parts around the magnet opening portion 114. It is noted that FIG. 3 illustrates a condition in which the first magnet 12a and the second magnet 12b are inserted in the first magnet opening 112 and the second magnet opening 113, respectively.

Referring to FIG. 3, the first magnet opening 112 has a shape that connects together a first opening portion 112a, a second opening portion 112b, and a third opening portion 112c. Similarly, the second magnet opening 113 has a shape that connects together a first opening portion 113a, a second opening portion 113b, and a third opening portion 113c. It is noted that, since the first magnet opening 112 and the second magnet opening 113 are of symmetrical configuration, only the shape of the first magnet opening 112 will be described below.

The first opening portion 112a is formed along the profile of the first magnet 12a. Specifically, the first magnet 12a is a rectangular permanent magnet, so that the first opening portion 112a is formed into a rectangle. The first magnet 12a is inserted into the first opening portion 112a.

The second opening portion 112b is formed near a position at which the first magnet 12a and the second magnet 12b are brought closest together. Specifically, the second opening portion 112b is formed into a shape that covers a corner portion 120a that is, out of corner portions of the first magnet 12a, the closest to the second magnet 12b.

The corner portion 120a is where demagnetization tends to occur in the first magnet 12a. Specifically, the opposing magnetic flux produced as a result of, for example, the armature reaction, specifically, the magnetic flux flowing from the stator 20 to the center of the rotor core 11 tends to concentrate at an area between the first magnet 12a and the second magnet 12b. As a result, the corner portion 120a of the first magnet 12a disposed closest to the second magnet 12b is more susceptible to the demagnetization.

An area between the corner portion 120a of the first magnet 12a and a corner portion 120b of the second magnet 12b closest to the first magnet 12a, in particular, is narrow compared with other portions. This causes the magnetic flux flowing from the stator 20 to the center of the rotor core 11 to further tend to concentrate.

In contrast, the rotor core 11 according to the first embodiment has the second opening portion 112b formed so as to cover the corner portion 120a of the first magnet 12a. This results in an air gap being formed between the corner portion 120a of the first magnet 12a and the rotor core 11. Air in the air gap has a lower permeability than a metal, such as iron that forms the rotor core 11. Thus, the second opening portion 112b's covering the corner portion 120a with the air gap defined therebetween allows demagnetization of the corner portion 120a to be made hard to occur.

An even more specific arrangement of the second opening portion 112b will be described below with reference to FIG.

Figure 4:
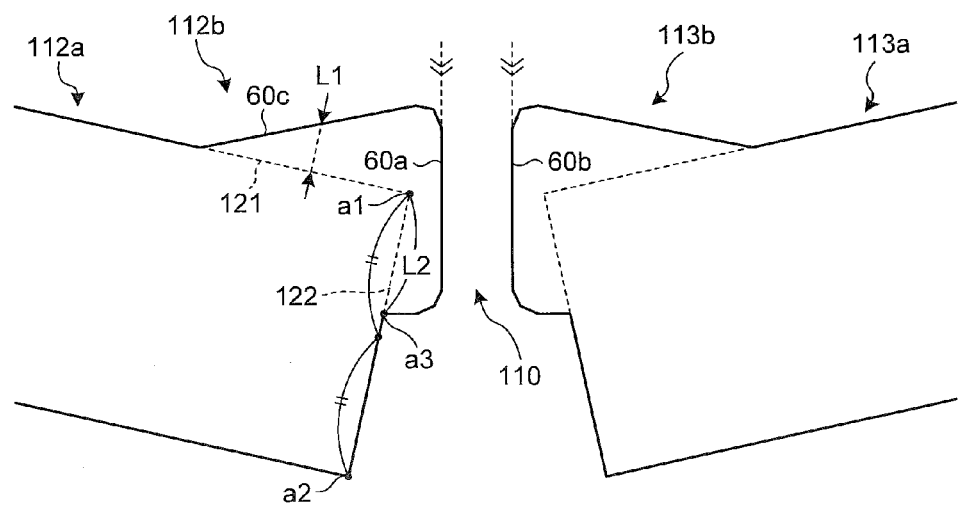
FIG. 4 is an enlarged view illustrating parts around second opening portions illustrated in FIG. 3.

4. FIG. 4 is an enlarged view illustrating parts around the second opening portion 112b illustrated in FIG. 3.

Referring to FIG. 4, the second opening portion 112b is formed into a shape to cover part of a side surface 121 on the outer peripheral side of the first magnet 12a (see FIG. 3) and part of a side surface 122 of the first magnet 12a (see FIG. 3) facing the second magnet 12b (see FIG. 3). It is noted that a portion including each of the part of side surface 121 and the part of side surface 122 constitutes the corner portion 120a of the first magnet 12a.

An area between the first magnet opening 112 and the second magnet opening 113 is called a bridge portion. The magnetic flux produced by, for example, the armature reaction mainly passes through such a bridge portion.

The corner portion 120a is disposed at a position away from a bridge portion 110. Therefore, as compared with a case in which the corner portion 120a is disposed at a position adjoining the bridge portion 110, the corner portion 120a is less affected by the demagnetization.

Additionally, the second opening portion 112b is formed into a shape that results in a distance L1 between a side surface 60c on the outer peripheral side and the side surface 121 on the outer peripheral side in the first magnet 12a increasing toward the bridge portion 110.

Specifically, the larger the shape of the second opening portion 112b, the less the first magnet 12a is affected by the demagnetization on one hand; on the other hand, the more likely the effective magnetic flux flowing from the first magnet 12a to the stator 20 is to be impeded by the second opening portion 112b. Therefore, by forming the second opening portion 112b such that the distance L1 is greater at positions closer to the corner portion 120a of the first magnet 12a, the effective magnetic flux can be prevented from being reduced, while demagnetization of the corner portion 120a of the first magnet 12a is made hard to occur.

In the first embodiment, the corner portion 120a is disposed at a position away from the bridge portion 110. The corner portion 120a is therefore less likely to be demagnetized, as compared with a case in which the corner portion 120a is not disposed at a position away from the bridge portion 110. Thus, compared with a case in which the corner portion 120a is not disposed at a position away from the bridge portion 110, the distance L1 can be made small. The smaller the distance L1, the effective magnetic flux is less likely to be impeded by the second opening portion 112b. In the first embodiment, therefore, the effective magnetic flux can be further prevented from being reduced.

Referring further to FIG. 4, the second opening portions 112b, 113b have side surfaces 60a, 60b, respectively, that face each other and extend in parallel with each other.

Specifically, the bridge portion 110 is an area having a relatively low strength in the rotor core 11. Thus, forming the side surfaces 60a, 60b so as to extend in parallel with each other prevents the strength of the bridge portion 110 from being reduced and the corner portion 120a from being easily demagnetized.

FIG. 4 exemplifies a case in which the side surfaces 60a, 60b that face each other of the second opening portions 112b, 113b extend in parallel with each other. The side surfaces 60a, 60b may not, however, necessarily extend in parallel with each other.

In the first embodiment, the second opening portions 112b, 113b are formed so that magnetic saturation occurs in the bridge portion 110 between the second opening portions 112b, 113b. When magnetic saturation occurs, no more magnetic flux flows through the bridge portion 110. Specifically, the amount of magnetic flux flowing through the bridge portion 110 is limited, so that magnetic flux leakage of the first magnet 12a can be reduced and thereby the effective magnetic flux can be prevented from being reduced.

It is noted that when the bridge portion 110 is saturated, the magnetic flux leakage of the first magnet 12a can be reduced and reduction in the effective magnetic flux can be suppressed, yet the corner portion 120a tends to be demagnetized. By contrast, if the bridge portion 110 is not saturated, the corner portion 120a does not tend to be demagnetized; but the magnetic flux leakage of the first magnet 12a increases and the effective magnetic flux tends to decrease. The width of the bridge portion 110 may be determined in consideration of the foregoing factors and, in the first embodiment, the bridge portion 110 is to be saturated. This is, however, not the only possible arrangement.

It is noted that, to make the bridge portion 110 easy to saturate, the width has only to be made narrow. In contrast, to make the bridge portion 110 hard to saturate, the width has only to be made wide.

Figure 5A:
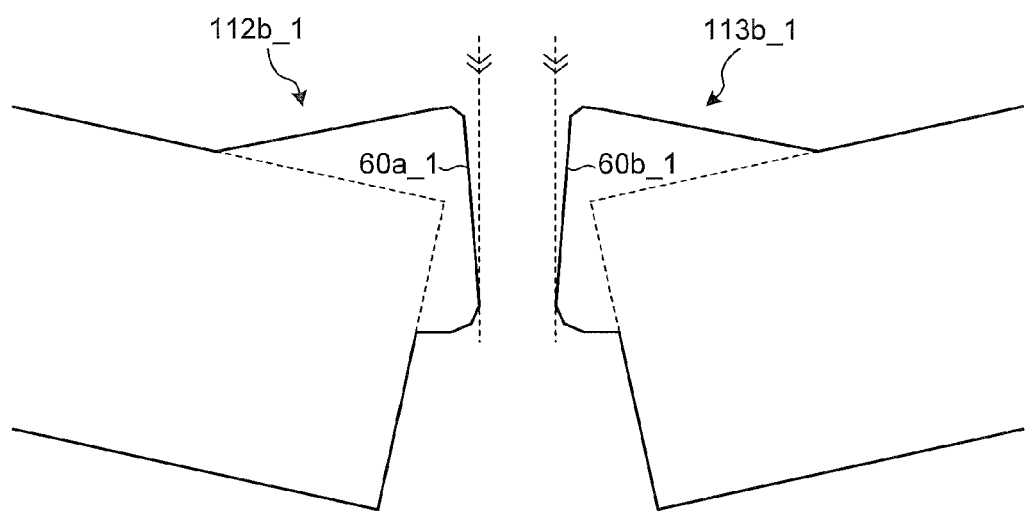
FIGS. 5A and 5B are illustrations illustrating other exemplary shapes of the second opening portions.

FIG. 5A illustrates another exemplary shape of the second opening portion. For example, referring to FIG. 5A, side surfaces 60a_1, 60b_1 that face each other of second opening portions 112b_1, 113b_1 may be shaped to be spaced away from each other toward the outer peripheral side.

To prevent the corner portion 120a from being demagnetized even more reliably, preferably magnetic flux is made to flow through the bridge portion 110 as much as possible by shortening the length of the bridge portion 110, for the foregoing arrangement can prevent the corner portion 120a from being demagnetized: specifically, the corner portion 120a is demagnetized by the magnetic flux that fails to flow through the bridge portion 110 due to magnetic saturation involved and that thereby flows through, for example, the second opening portion 112b.

Therefore, in the side surface 122 of the first magnet 12a facing the second magnet 12b, preferably a length L2 from a vertex a1 of the corner portion 120a to an end portion a3 of the second opening portion 112b is shorter than ½ of a length of the side surface 122 (a length from the vertex a1 to a vertex a2). To state the foregoing differently, preferably the length L2 is shorter than ½ of a length of a side surface in a lateral direction of the first magnet 12a.

Figure 5B:
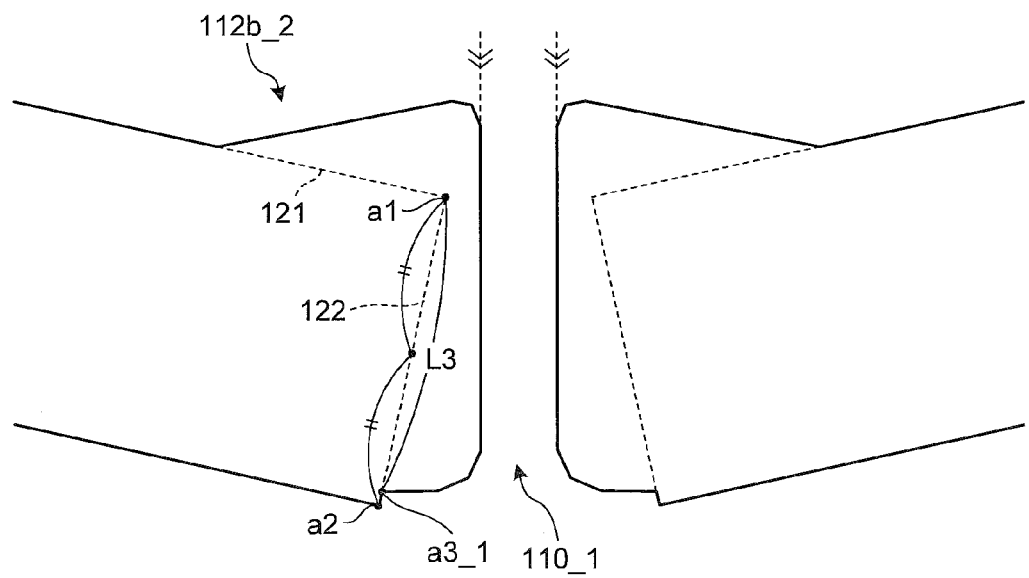

Nonetheless, the length from the vertex a1 to the end portion a3 of the second opening portion 112b is not limited to the foregoing only. FIG. 5B illustrates still another exemplary shape of the second opening portion.

For example, referring to FIG. 5B, a length L3 from a vertex a1 to an end portion a3_1 of a second opening portion 112b_2 may be longer than ½ of a length of a side surface 122 of a first magnet 12a (a length from the vertex a1 to a vertex a2). To state the foregoing differently, preferably the length L3 may be longer than ½ of the length of the side surface in the lateral direction of the first magnet 12a. This causes the magnetic flux to be hard to flow through a bridge portion 110_1, so that the amount of magnetic flux leaking to the first magnet 12a by way of the bridge portion 110_1 can be reduced during normal operation.

Referring back to FIG. 3, the third opening portion 112c will be described. The third opening portion 112c is an extension toward the outer peripheral side extended from an end portion of the first opening portion 112a. The third opening portion 112c is formed to reduce the magnetic flux leakage by generating magnetic saturation in an area between the third opening portion 112c and an outer periphery of the rotor core 11.

Having the third opening portion 112c narrows the space between the first magnet opening 112 and the outer periphery of the rotor core 11. As a result, the magnetic saturation tends to occur in the area between the third opening portion 112c and the outer periphery of the rotor core 11, which makes the magnetic flux hard to flow through the area. Since the leaky magnetic flux flows through this area to an S pole, having the third opening portion 112c can reduce the magnetic flux leakage.

As described heretofore, the rotor core according to the first embodiment has a pair of magnet openings disposed such that the space therebetween widens toward the outer peripheral side, in which a pair of permanent magnets having a magnetic pole direction relative to the radial direction identical to each other is inserted.

The magnet openings each have a shape that connects together the first opening portion and the second opening portion. The first opening portion is formed along the profile of the permanent magnet. The second opening portion covers, when a permanent magnet is inserted in the first opening portion, a corner portion of the permanent magnet, that is, out of the corner portions of the permanent magnet, the closest to the other permanent magnet with a predetermined air gap. The second opening portion forms a bridge portion between the second opening portion and a second opening portion in the other magnet opening.

In the rotor core according to the first embodiment, therefore, demagnetization of the permanent magnet can be made hard to occur.

Second Embodiment

Figure 6:
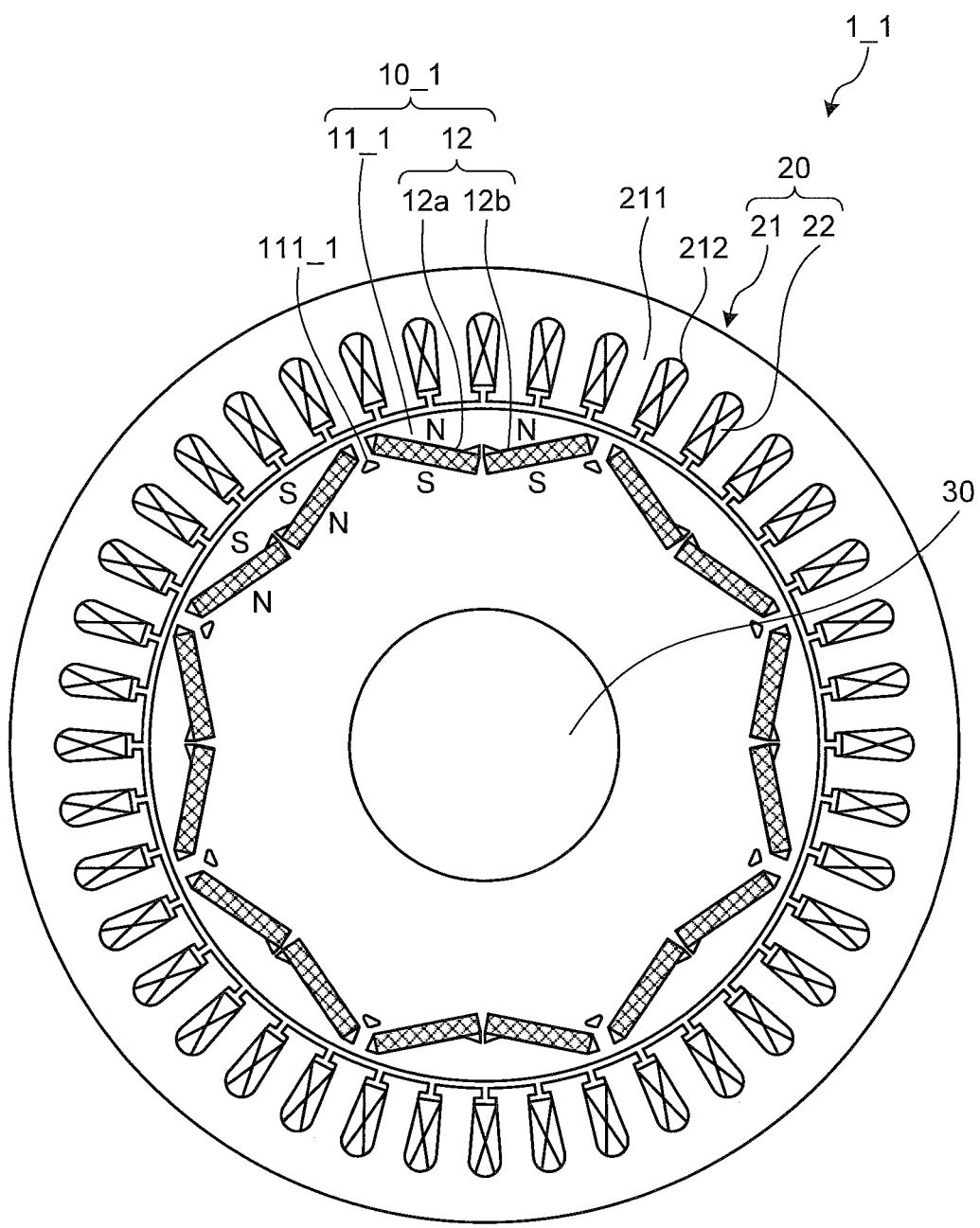
FIG. 6 is a schematic view illustrating a motor according to a second embodiment as viewed from an axial direction of a shaft.

The shape of, for example, the magnet opening formed in the rotor core is not limited to that exemplified in the first embodiment described above. Other exemplary shapes involved in the rotor core will be described below. FIG. 6 is a schematic view illustrating a motor according to a second embodiment as viewed from an axial direction of a shaft. In the description that follows, like or corresponding parts as those described above are identified by the same reference numerals as those used for the first embodiment and descriptions for those parts will not be duplicated.

Referring to FIG. 6, a motor 1_1 according to the second embodiment includes a rotor 10_1, a stator 20, and a shaft 30. The rotor 10_1 includes a rotor core 11_1 and permanent magnets 12. The rotor core 11_1 has a cavity portion 111_1 formed therein relative to an area sandwiched between the adjacent permanent magnets 12.

Similarly to the motor 1 according to the first embodiment, the motor 1_1 according to the second embodiment includes a first magnet 12a and a second magnet 12b disposed such that the space therebetween forms a V shape that widens toward an outer peripheral side of the rotor core 11_1.

The motor 1_1 will here be described for an exemplary arrangement that includes the same permanent magnets 12 as the permanent magnets 12 according to the first embodiment. It is nonetheless noted that the motor 1_1 may include a type of permanent magnets different from that of the permanent magnets 12. In addition, the motor 1_1 will here be described for an exemplary arrangement that includes the same stator 20 and shaft 30 as the stator 20 and the shaft 30 according to the first embodiment. It is nonetheless noted that the motor 1_1 may include types of stator and shaft different from those of the stator 20 and the shaft 30.

Figure 7:
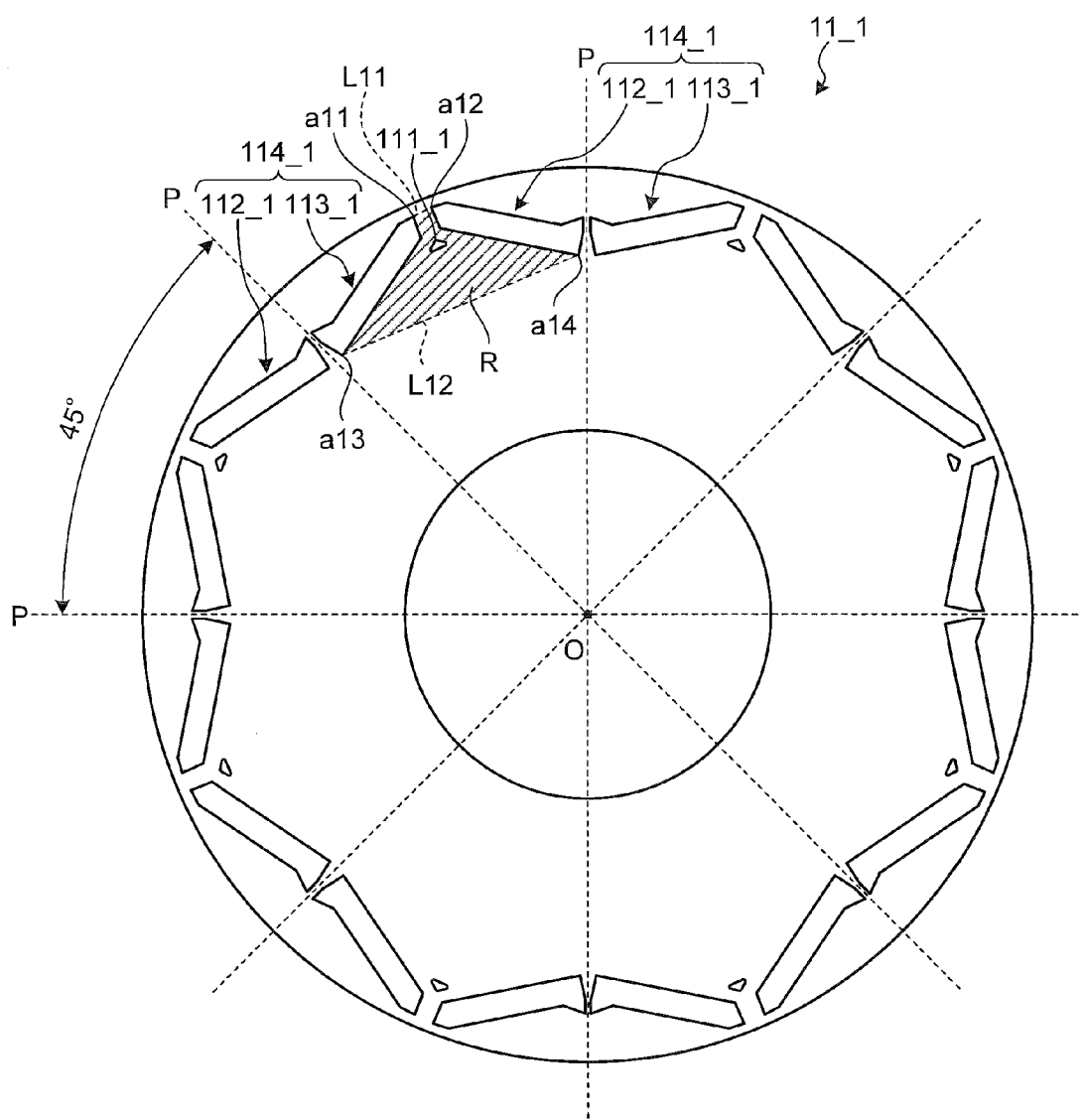
FIG. 7 is a schematic view illustrating an arrangement of a rotor core according to the second embodiment.

An arrangement of the rotor core 11_1 according to the second embodiment will be described below with reference to FIG. 7. FIG. 7 is a schematic view illustrating the arrangement of the rotor core 11_1 according to the second embodiment.

Referring to FIG. 7, the rotor core 11_1 has magnet opening portions 114_1 formed in juxtaposition with each other in the circumferential direction, each of the magnet opening portions 114_1 including a set of a first magnet opening 112_1 and a second magnet opening 113_1. Each of the magnet opening portions 114_1 is disposed such that the first magnet opening 112_1 and the second magnet opening 113_1 are symmetrical to each other about a polar pitch line P placed at a polar pitch angle of 45 degrees.

The first magnet opening 112_1 is an opening in which the first magnet 12a is to be inserted. The second magnet opening 113_1 is an opening in which the second magnet 12b is to be inserted. The first magnet opening 112_1 and the second magnet opening 113_1 are disposed such that the space therebetween forms a V shape that widens toward the outer peripheral side.

Referring to FIG. 7, the cavity portion 111_1 is formed relative to an area R. The area R is sandwiched between the first magnet opening 112_1 and the second magnet opening 113_1 that is adjacent to the first magnet opening 112_1 and in which the second magnet 12b having an opposite magnetic pole direction is to be inserted (specifically, the second magnet opening 113_1 included in another magnet opening portion 114_1).

Specifically, the area R is enclosed by a virtual line L11, a virtual line L12, and the abovementioned two magnet openings 112_1, 113_1. The virtual line L11 connects between a point a11 and a point a12 disposed at extreme ends on the outer peripheral side of the two magnet openings 112_1, 113_1. The virtual line L12 connects between a point a13 and a point a14 disposed at extreme ends on the side of a rotation center O of the two magnet openings 112_1, 113_1.

A specific disposition and shape of the cavity portion 111_1 will be described below with reference to FIG. 8. FIG. 8 is an enlarged schematic view illustrating parts around the cavity portion 111_1.

It is to be noted that, in the description to be given hereunder with reference to FIG. 8, the second magnet opening 113_1 illustrated in FIG. 7, specifically, out of the two second magnet openings 113_1 adjacent to the first magnet opening 112_1, the second magnet opening 113_1 in which the second magnet 12b having an opposite magnetic pole direction is to be inserted will be referred to as the "second magnet opening 113_1".

Referring to FIG. 8, the cavity portion 111_1 is formed, of the area R (see FIG. 7), in an area in which the first magnet opening 112_1 and the second magnet opening 113_1 are close together. This is because the magnetic flux of the permanent magnet 12 leaking from the N pole to the S pole of the permanent magnet 12, if any, is highly likely to flow through this area.

Assume that the magnetic flux leakage occurs in, for example, the first magnet 12a inserted in the first magnet opening 112_1. The leaky magnetic flux reaching the S pole of the first magnet 12a is more in quantity at positions closer to a point a16 in the first magnet opening 112_1 and less in quantity at points farther away from the point a16 along a side surface 65a of the first magnet opening 112_1. The point a16 is one of points at which the first magnet opening 112_1 and the second magnet opening 113_1 are the closest to each other.

Meanwhile, only a slight amount of leaky magnetic flux reaches the side of the point a14 (see FIG. 7) relative to a point a18 in the first magnet opening 112_1, affecting little performance of the motor 1_1. The point a18 is ⅓ of a distance from the point a16 to the point a14.

In the second embodiment, the cavity portion 111_1 is therefore formed in an area R1 as illustrated in FIG. 8. The area R1 is on the outer peripheral side of a virtual line L14 that connects between a point a17 on the second magnet opening 113_1 and the point a18 on the first magnet opening 112_1. Further, the area R1 is on the side of the rotation center O of a virtual line L13 that connects between a point a15 on the second magnet opening 113_1 and the point a16 on the first magnet opening 112_1. It is here noted that the point a15 in the second magnet opening 113_1 is where a vertex of a corner portion 120b of the second magnet 12b is disposed and is the closest to the first magnet opening 112_1. Additionally, the point a17 is ⅓ of a distance from the point a15 to the point a13 (see FIG. 7). This allows the magnetic flux leakage between the permanent magnets 12 to be effectively reduced.

Additionally, the first magnet opening 112_1 has a third opening portion 112c_1 formed therein, details of which will be described with reference to FIG. 9. The third opening portion 112c_1 forms an air gap relative to the first magnet 12a when the first magnet 12a is inserted in place.

Having the third opening portion 112c_1 narrows the space between the first magnet opening 112_1 and the outer periphery of the rotor core 11_1. As a result, magnetic saturation tends to occur in the area between the third opening portion 112c_1 and the outer periphery of the rotor core 11_1, which makes the magnetic flux hard to flow through the area. Since the leaky magnetic flux flows through this area to the S pole, having the third opening portion 112c_1 can reduce the magnetic flux leakage.

The cavity portion 111_1 is disposed such that the minimum space between the cavity portion 111_1 and the first magnet opening 112_1 is identical to the minimum space between the first magnet opening 112_1 and the outer periphery of the rotor core 11_1. This holds true of the minimum space between the cavity portion 111_1 and the second magnet opening 113_1.

As described above, the space between the cavity portion 111_1 and each of the first magnet opening 112_1 and the second magnet opening 113_1 is set to be identical to the space between each of the first magnet opening 112_1 and the second magnet opening 113_1 and the outer periphery of the rotor core 11_1. This causes the magnetic saturation to tend to occur even between the cavity portion 111_1 and each of the first magnet opening 112_1 and the second magnet opening 113_1, which reduces the magnetic flux leakage even further.

In addition, the cavity portion 111_1 has a side surface 50a that faces the first magnet opening 112_1. The side surface 50a is formed to extend in parallel with the side surface 65a of the first magnet opening 112_1 that faces the cavity portion 111_1. Similarly, the cavity portion 111_1 has a side surface 50b that faces the second magnet opening 113_1. The side surface 50b is formed to extend in parallel with a side surface 65b of the second magnet opening 113_1 that faces the cavity portion 111_1. It is to be noted that, though the side surface 50a and the side surface 65a are to extend in parallel with each other and the side surface 50b and the side surface 65b are to extend in parallel with each other, the side surfaces' extending in parallel with each other are not the only possible arrangement.

Specifically, the side surfaces 50a, 50b in the cavity portion 111_1 and the side surfaces 65a, 65b in the first magnet opening 112_1 and the second magnet opening 113_1, respectively, are disposed at all times in the condition of being close together at the minimum space described above. This makes magnetic resistance greater between the cavity portion 111_1 and each of the first magnet opening 112_1 and the second magnet opening 113_1, which makes magnetic saturation occur even more easily. The magnetic flux leakage can thus be further reduced. It is noted that the cavity portion may have all or part of the side surfaces facing the magnet openings extending in parallel.

An arrangement of the magnet opening portion 114_1 will be described below with reference to FIG. 9. FIG. 9 is a schematic view illustrating the arrangement of the magnet opening portion 114_1.

Referring to FIG. 9, the magnet opening portion 114_1 includes the first magnet opening 112_1 and the second magnet opening 113_1. The first magnet opening 112_1 has a shape that connects together a first opening portion 112a_1, a second opening portion 112b_3, and the third opening portion 112c_1. Similarly, the second magnet opening 113_1 has a shape that connects together a first opening portion 113a_1, a second opening portion 113b_3, and a third opening portion 113c_1. It is noted that, since the first magnet opening 112_1 and the second magnet opening 113_1 are of symmetrical configuration, only the shape of the first magnet opening 112_1 will be described below.

The first opening portion 112a_1 is formed along the profile of the first magnet 12a. The first magnet 12a is inserted into the first opening portion 112a_1.

The second opening portion 112b_3 and the third opening portion 112c_1 form an air gap relative to the first magnet 12a when the first magnet 12a is inserted in the first opening portion 112a_1.

The third opening portion 112c_1 is an extension toward the outer peripheral side extended from an end portion of the first opening portion 112a_1. The third opening portion 112c_1 is formed to reduce the magnetic flux leakage by generating magnetic saturation in an area between the third opening portion 112c_1 and the outer periphery of the rotor core 11_1 as described earlier.

The second opening portion 112b_3 is formed near a position at which the first opening portion 112a_1 in the first magnet opening 112_1 and the first opening portion 113a_1 in the second magnet opening 113_1 are closest to each other. The second opening portion 112b_3 is formed at a position at which the first magnet 12a is easily affected by demagnetization.

Figure 10A:
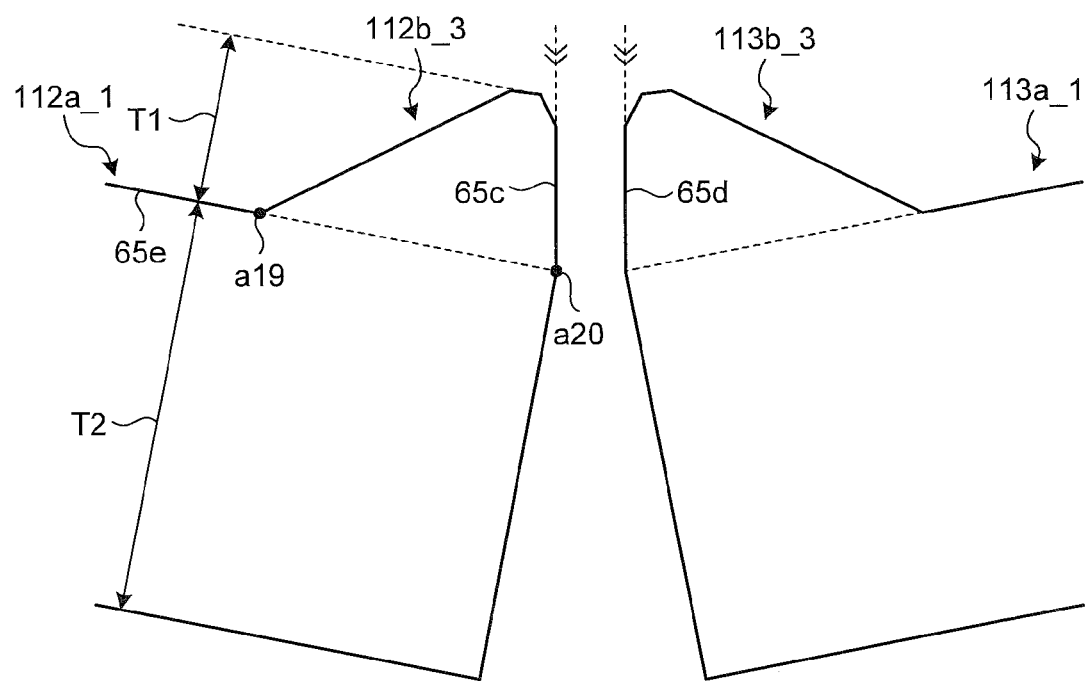
FIG. 10A is an enlarged schematic view illustrating parts around the second opening portions.
Figure 10B:
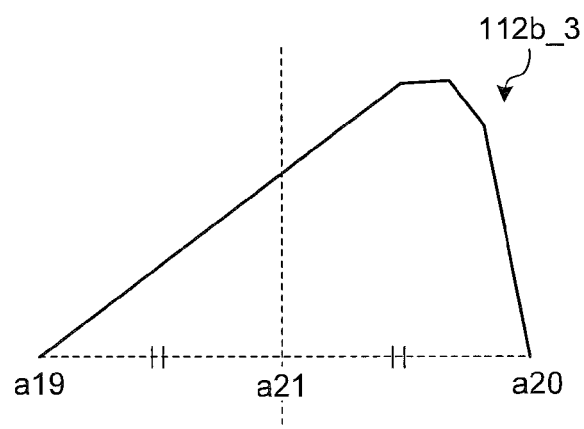
FIG. 10B is a schematic view illustrating an arrangement of the second opening portion.

A specific shape and disposition of the second opening portion 112b_3 will be described below with reference to FIGS. 10A and 10B. FIG. 10A is an enlarged schematic view illustrating parts around the second opening portion 112b_3. FIG. 10B is a schematic view illustrating an arrangement of the second opening portion 112b_3.

Referring to FIG. 10A, the second opening portion 112b_3 has a shape that represents part of a side surface 65e on the outer peripheral side of the first opening portion 112a_1 extended toward the outer peripheral side.

It is noted that the first magnet 12a is more likely to be affected by demagnetization at points closer to a position in the side surface on the outer peripheral side closest to the second magnet 12b (the position corresponding to a point a20 of the first magnet opening 112_1).

Additionally, the larger the shape of the second opening portion 112b_3, the more easily demagnetization can be prevented from occurring on one hand; on the other hand, the more likely the effective magnetic flux flowing from the first magnet 12a to the stator 20 is to be impeded by the second opening portion 112b_3. The second opening portion 112b_3 is therefore formed to have a gradually increasing thickness from a point a19 that is the farthest from the second magnet opening 113_1 to the point a20 that is the closest to the second magnet opening 113_1.

Specifically, referring to FIG. 10B, the second opening portion 112b_3 has a shape such that a distribution of its thickness with reference to the side surface 65e of the first opening portion 112a_1 is offset toward the second magnet opening 113_1. Specifically, the second opening portion 112b_3 has a substantially triangular shape having a vertex on the side of the point a20 relative to a middle point a21 between the point a19 and the point a20.

The second opening portion 112b_3, having a shape such that the distribution of its thickness with reference to the side surface 65e of the first opening portion 112a_1 is offset toward the second magnet opening 113_1 as described above, allows demagnetization of the first magnet 12a to be made hard to occur, while preventing the effective magnetic flux from being reduced.

Additionally, in the example of FIG. 10A, the second opening portion 112b_3 is formed such that a maximum thickness T1 with reference to the side surface 65e of the first opening portion 112a_1 is about ½ of a maximum thickness T2 in the first opening portion 112a_1. This adequately prevents demagnetization from occurring and the effective magnetic flux from being reduced in the first magnet 12a. Even more preferably, the maximum thickness T1 falls within a range of about ¼ to about ½ of the maximum thickness T2.

In addition, the second opening portion 112b_3 of the first magnet opening 112_1 and the second opening portion 113b_3 of the second magnet opening 113_1 have side surfaces 65c and 65d, respectively, that face each other and extend in parallel with each other.

Specifically, an area at which the first magnet opening 112_1 and the second magnet opening 113_1 are closest together has a relatively low strength in the rotor core 11_1. Thus, forming the side surfaces 65c, 65d that face each other of the second opening portion 112b_3 and the second opening portion 113b_3, respectively, so as to extend in parallel with each other prevents the strength of the area at which the first magnet opening 112_1 and the second magnet opening 113_1 are closest together from being reduced as much as possible. In addition, having the side surfaces 65c, 65d that face each other of the second opening portion 112b_3 and the second opening portion 113b_3, respectively, extending in parallel with each other allows leaky magnetic flux flowing through the area between the side surfaces 65c, 65d to the S pole to be reduced.

As described heretofore, the rotor core according to the second embodiment has a plurality of magnet openings and cavity portions. The magnet openings are in juxtaposition with each other in the circumferential direction. Permanent magnets are inserted in the magnet openings. The cavity portions are each formed relative to an area sandwiched between two magnet openings, out of the magnet openings, in which the permanent magnets that are mutually adjacent and that have magnetic pole directions relative to the radial direction opposite to each other are inserted. The magnetic flux leakage of the permanent magnet can thus be reduced.

Additionally, in the second embodiment, the cavity portion 111_1 forms, between the cavity portion 111_1 and the side surfaces on the inner peripheral side of the two magnet openings 112_1, 113_1, parallel paths having closest points a16, a15 of the two magnet openings 112_1, 113_1 as starting points, respectively. Each of the paths has a width that is equal to or less than the minimum space between each of the magnet openings 112_1, 113_1 and the outer periphery of the rotor core 11_1. This makes the magnetic resistance greater between the cavity portion 111_1 and each of the magnet openings 112_1, 113_1, which makes the magnetic saturation occur even more easily. The magnetic flux leakage can thus be further reduced.

In the second embodiment, the cavity portion 111_1 forms the parallel paths for generating the magnetic saturation in the areas between the cavity portion 111_1 and the side surfaces on the inner peripheral side of the two magnet openings 112_1, 113_1, respectively, the parallel paths having the closest points a16, a15 of the two magnet openings 112_1, 113_1 as their starting points. This makes the magnetic resistance greater between the cavity portion 111_1 and each of the magnet openings 112_1, 113_1, which makes the magnetic saturation occur even more easily. The magnetic flux leakage can thus be further reduced.

In the rotor core according to the second embodiment, the magnet openings each have a shape that connects together the first opening portion formed along the profile of a permanent magnet and the second opening portion that forms an air gap relative to the permanent magnet when the permanent magnet is inserted in the first opening portion. In the rotor core according to the second embodiment, the second opening portion is formed near a position at which the first opening portions are closest to each other. This allows the demagnetization of the permanent magnet to be made hard to occur.

The disposition and the shape of the cavity portion are not limited to those of the cavity portion 111_1 described above. Other exemplary dispositions and shapes of the cavity portion will be described below. FIGS. 11A to 11E are schematic views illustrating other arrangements of the cavity portion. FIG. 11F is a schematic view illustrating another arrangement of the rotor core. In the description that follows, like or corresponding parts as those described above are identified by the same reference numerals as those described above and descriptions for those parts will not be duplicated.

For example, the second embodiment has been exemplarily described for a case in which the minimum space between the cavity portion 111_1 and the first magnet opening 112_1 is equal to the minimum space between the first magnet opening 112_1 and the outer periphery of the rotor core 11_1. Nonetheless, the minimum space between the cavity portion and the first magnet opening may be smaller than the minimum space between the first magnet opening and the outer periphery of the rotor core.

Figure 11A:
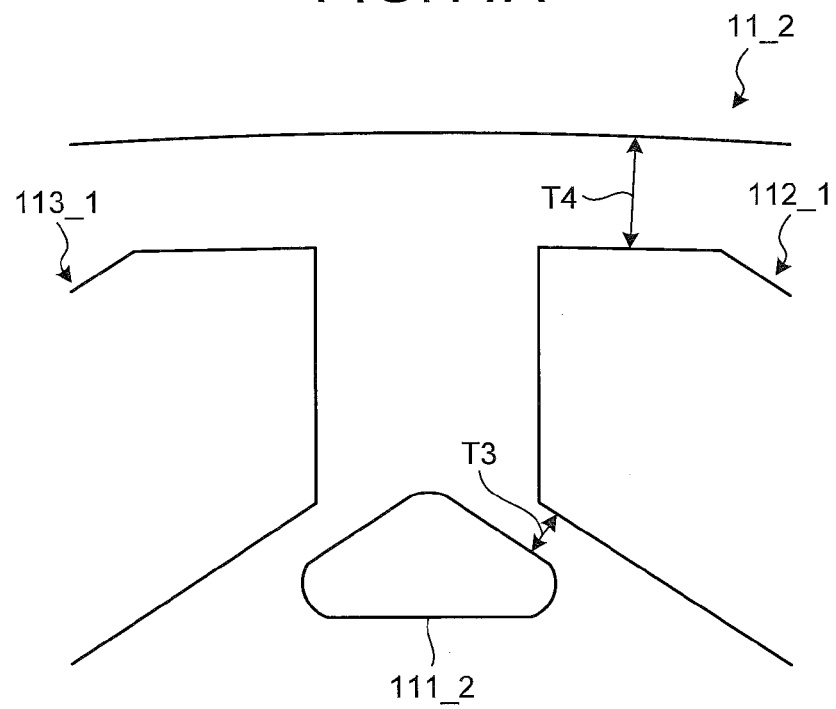
FIGS. 11A to 11E are schematic views illustrating other arrangements of the cavity portion.
Figure 11B:
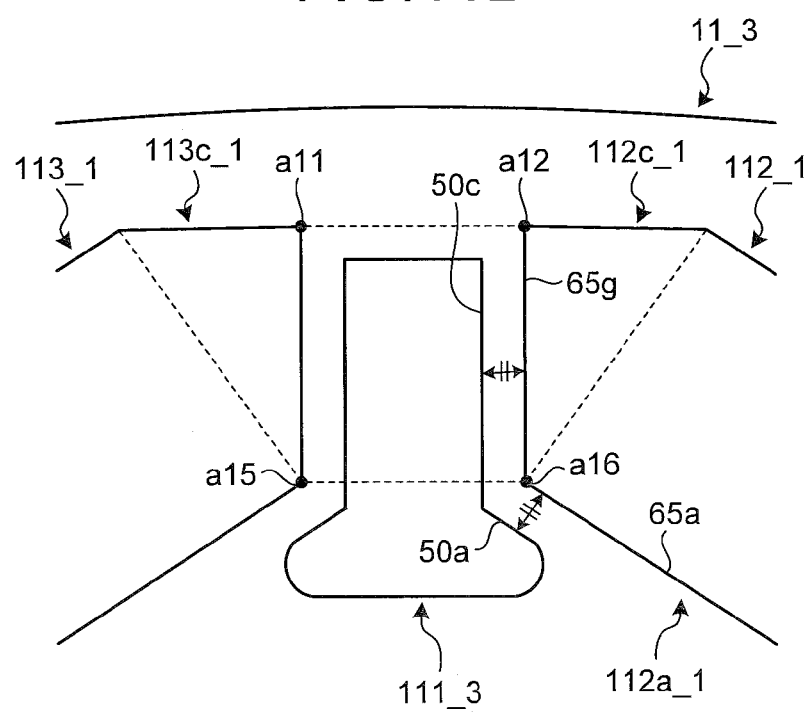

For example, referring to FIG. 11A, a rotor core 11_2 has a cavity portion 111_2 formed such that the minimum space T3 relative to a first magnet opening 112_1 is about ½ of the minimum space T4 between the first magnet opening 112_1 and the outer periphery of the rotor core 11_2. By even further narrowing the minimum space between the cavity portion 111_2 and the first magnet opening 112_1, the magnetic flux leakage is harder to pass through an area between the cavity portion 111_2 and the first magnet opening 112_1, which reduces the magnetic flux leakage even further.

In addition, referring back to FIG. 8, the cavity portion may be extended from the area R1 to an area enclosed by the points a11, a12, a15, a16. For example, referring to FIG. 11B, a rotor core 11_3 has a cavity portion 111_3 that represents the cavity portion 111_2 illustrated in FIG. 11A having a leading end portion extended toward the outer peripheral side. Further reduction in the magnetic flux leakage can be achieved by forming the cavity portion also in the area enclosed by the points a11, a12, a15, a16 as described above.

It is noted that the cavity portion 111_3 is formed such that the minimum space between a side surface 50c that faces a third opening portion 112c_1 and a side surface 65g of the third opening portion 112c_1 that faces the side surface 50c is equal to the minimum space between a side surface 50a that faces a first opening portion 112a_1 and a side surface 65a of the first opening portion 112a_1 that faces the side surface 50a. This makes the magnetic resistance even greater between the cavity portion 111_3 and a first magnet opening 112_1. The magnetic flux leakage can be further reduced.

Additionally, the second embodiment has been exemplarily described for a case in which the cavity portion 111_1 is formed on the outer periphery side of the rotor core 11_1 relative to the virtual line L14 that connects between the point a17 on the second magnet opening 113_1 and the point a18 on the first magnet opening 112_1 (see FIG. 8). The cavity portion may, nonetheless, be formed on the side of the rotation center O relative to the virtual line L14.

Figure 11C:
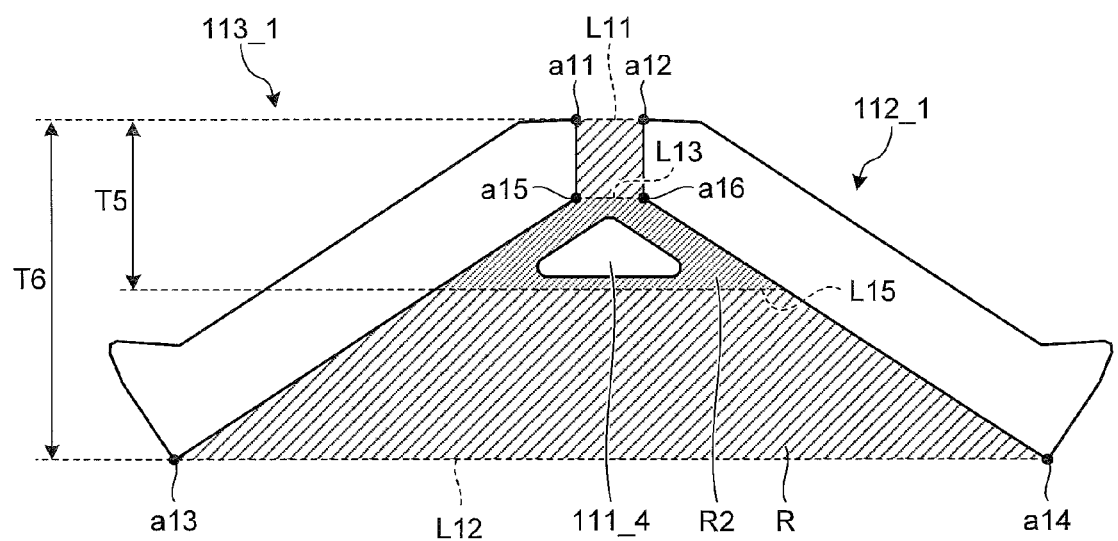

For example, referring to FIG. 11C, a cavity portion 111_4 is formed, within an area R, in an area R2 on the outer peripheral side of a virtual line L15 and on the side of the rotation center O of a virtual line L13. It is noted that the virtual line L15 divides the area R radially into two. Specifically, a distance T5 from a virtual line L11 to the virtual line L15 is half of a distance T6 from the virtual line L11 to a virtual line L12.

As described above, the cavity portion may be formed in the area R2 on the outer peripheral side relative to the virtual line L15 that divides the area R radially into two.

Additionally, in the second embodiment, the cavity portion is substantially triangular in shape, which, however, is not the only possible shape. Specifically, as long as at least part of the side surfaces of the cavity portion facing the magnet openings 112_1, 113_1 extends in parallel with the side surfaces of the magnet openings 112_1, 113_1, other portions of the cavity portion may be of any shape.

Figure 11D:
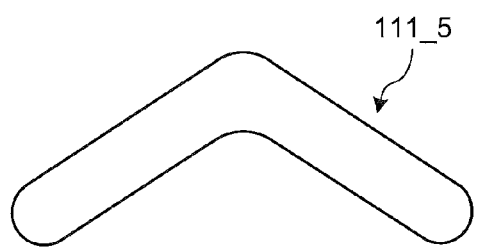
Figure 11E:
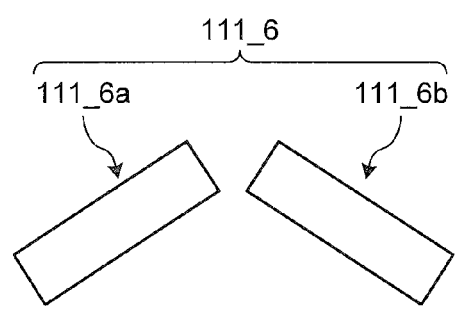
Figure 11F:
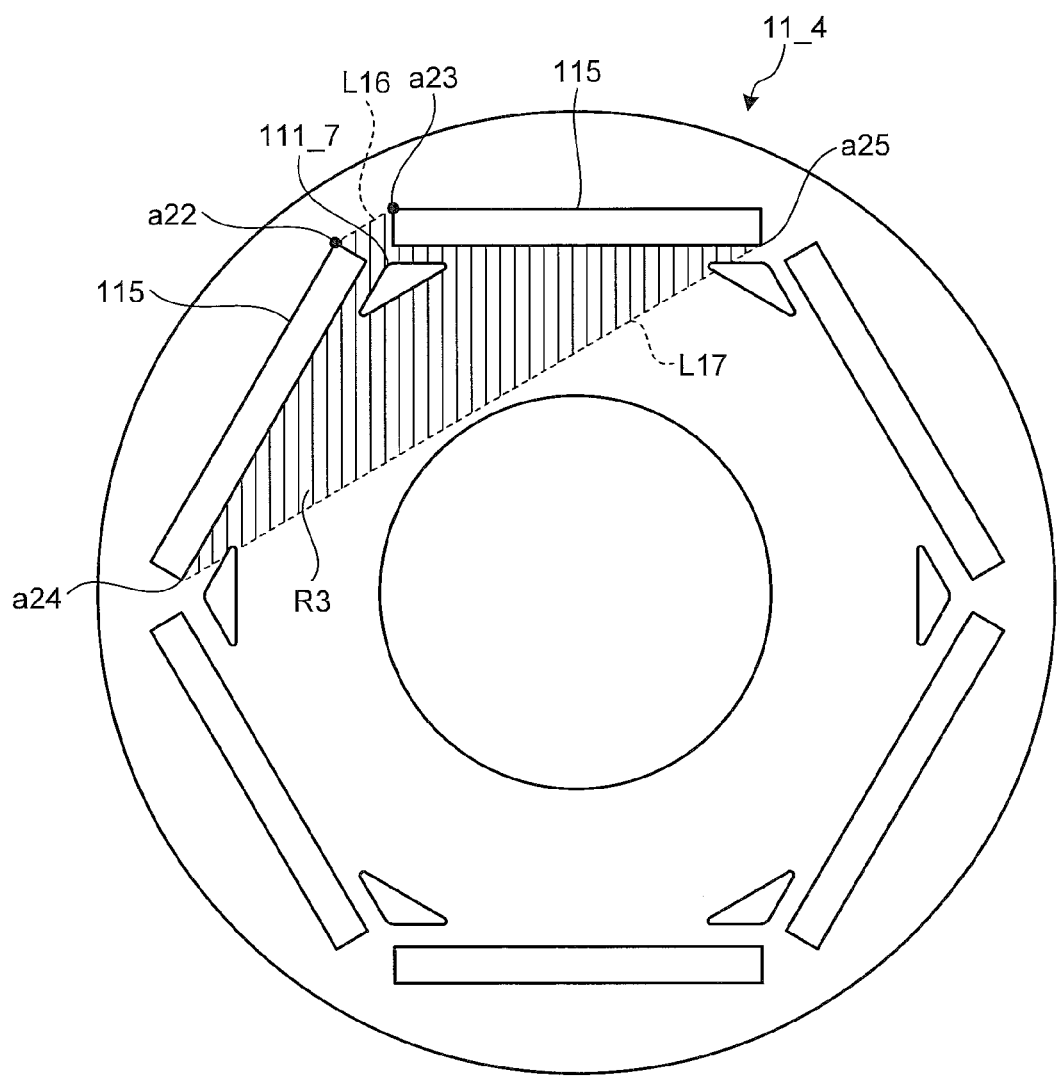
FIG. 11F is a schematic view illustrating another arrangement of the rotor core.

For example, referring to FIG. 11D, a cavity portion 111_5 may have a substantially boomerang shape having a side surface on the side of the rotation center O recessed toward the outer peripheral side. Further, referring to FIG. 11E, a cavity portion 111_6 may be divided into two cavity portions 111_6a, 111_6b, each being formed to extend in parallel with a corresponding side surface of the first magnet opening 112_1 and the second magnet opening 113_1.

Each of the first and second embodiments has been described for a case in which the permanent magnets 12 constituting a single pole comprise the first magnet 12a and the second magnet 12b. However, the cavity portion may still be formed relative to a rotor in which a single permanent magnet constitutes a single pole.

For example, referring to FIG. 11F, a rotor core 11_4 has six magnet openings 115 formed in juxtaposition with each other in the circumferential direction, in each of which a permanent magnet is inserted. Permanent magnets having magnetic pole directions relative to the radial direction opposite to each other are inserted in two mutually adjacent magnet openings 115 of the six magnet openings 115.

A cavity portion 111_7 is formed in an area R3 sandwiched between each pair of adjacent magnet openings 115. Specifically, the area R3 is defined by a virtual line L16 that connects between a point a22 and a point a23 disposed at extreme ends on the outer peripheral side of the two adjacent magnet openings 115, a virtual line L17 that connects between a point a24 and a point a25 disposed at extreme ends on the side of the rotation center O of the two adjacent magnet openings 115, and the abovementioned two magnet openings 115, 115.

In such a configuration of the cavity portion 111_7 formed relative to the rotor core 11_4 of the rotor in which a single permanent magnet constitutes a single pole, too, the magnetic flux leakage from between the permanent magnets can be reduced in the same manner as with the cavity portion according to each of the first and second embodiments described above.

Each of the first and second embodiments has been described for a case in which the leaky magnetic flux is made hard to pass because of the air in the air cavity. This is, however, not the only possible arrangement. With the rotor or the rotating electric machine disclosed in this application, for example, a resin, aluminum, or other nonmagnetic material may be filled in the cavity portion. Similarly, for example, a resin, aluminum, or other nonmagnetic material may be filled in the second opening portion or the third opening portion.

Figure 12:
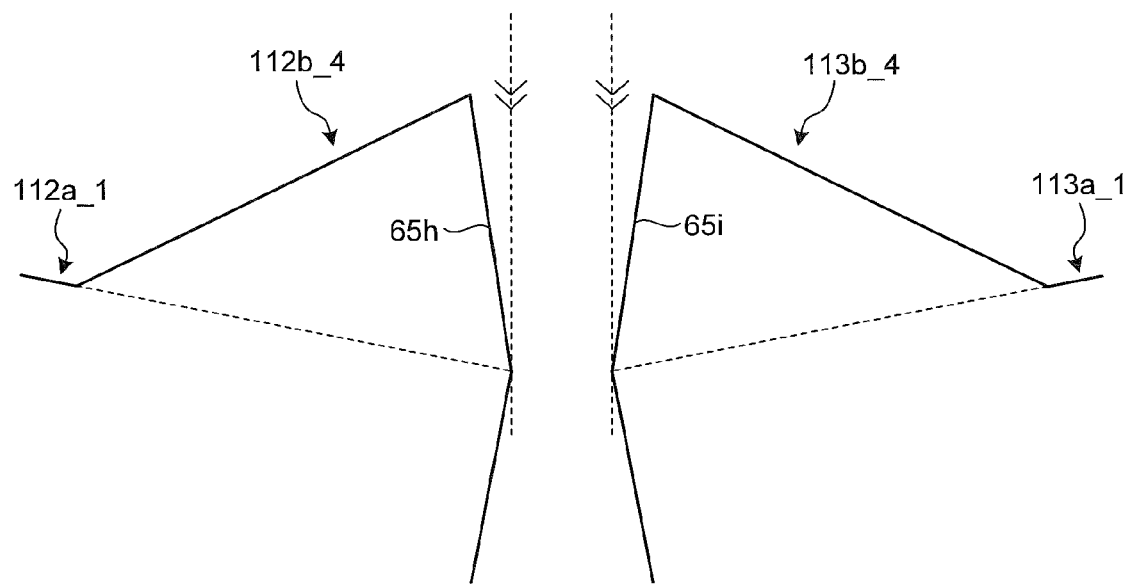
FIG. 12 is a schematic view illustrating another arrangement of the second opening portions.

The shape of the second opening portion the first magnet opening and the second magnet opening have is not limited to that of the second opening portion according to the second embodiment. Another exemplary arrangement of the second opening portion will then be described below with reference to FIG. 12. FIG. 12 is a schematic view illustrating another arrangement of the second opening portion.

For example, the second embodiment has been described for an exemplary case in which the side surfaces 65c and 65d that face each other of the second opening portions 112b_3, 113b_3, respectively, are extended in parallel with each other in order to ensure strength of the rotor core 11_1 (see FIG. 10A). The side surfaces that face each other of the second opening portions do not necessarily extend in parallel with each other.

For example, referring to FIG. 12, the second opening portion 112b_4 and the second opening portion 113b_4 may have side surfaces 65h, 65i that face each other formed to be farther apart from each other toward the outer peripheral side of the rotor core.

If the minimum space between the second opening portions is arranged so as not to be smaller than the minimum space between the first magnet opening and the second magnet opening, the strength of the area in which the first magnet opening and the second magnet opening are closest together can be prevented from being reduced as much as possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Additional aspects of the above-described embodiments will be disclosed below.

(1) A rotor core comprising:

a plurality of magnet openings formed in juxtaposition with each other in a circumferential direction and in which permanent magnets are inserted; and cavity portions, each being formed relative to an area sandwiched between two magnet openings, out of the magnet openings, in which permanent magnets that are mutually adjacent and that have magnetic pole directions relative to a radial direction opposite to each other are inserted.

(2) The rotor core according to (1), wherein the area is defined by a virtual line that connects together points in the two magnet openings disposed at extreme ends on an outer peripheral side, a virtual line that connects together points in the two magnet openings disposed at extreme ends on a rotation center side, and the two magnet openings.

(3) The rotor core according to (2), wherein the cavity portions are each formed in, of the area, an area formed on the rotation center side of a virtual line that connects together points of the two magnet openings closest to each other.

(4) The rotor core according to (3), wherein the cavity portions are each formed on the outer peripheral side of a virtual line that divides the area radially into two.

(5) The rotor core according to any one (1) to (4), wherein
the magnet openings are each formed into a substantially rectangular shape; and
the cavity portions are each formed such that at least part of side surfaces thereof facing the magnet openings extends in parallel with a side surface of the magnet openings.

(6) The rotor core according to any one of (1) to (5), wherein a minimum space between the cavity portions and the magnet openings is equal to or less than a minimum space between the magnet openings and an outer periphery of the rotor core.

(7) The rotor core according to any one of (1) to (6), wherein
the magnet openings each comprise a first magnet opening and a second magnet opening disposed such that a space therebetween widens toward the outer peripheral side and in which two permanent magnets having a magnetic pole direction relative to a radial direction identical to each other are inserted; and
the area is sandwiched between the first magnet opening and the second magnet opening included in another magnet opening adjacent to the first magnet opening.

(8) A rotor comprising:
a rotor core according to any one of (1) to (7); and
a permanent magnet inserted in the magnet openings the rotor core has.

(9) A rotating electric machine comprising:
the rotor according to (8); and
a stator disposed so as to face an outer peripheral surface of the rotor with an air gap defined therebetween.

(10) A rotor core comprising:
a pair of magnet openings disposed such that a space therebetween widens toward an outer peripheral side and in which two permanent magnets having a magnetic pole direction relative to a radial direction identical to each other are inserted, wherein
the magnet openings each have a shape that connects a first opening portion formed along a profile of the corresponding permanent magnet and a second opening portion that forms an air gap relative to the permanent magnet when the permanent magnet is inserted in the first opening portion; and
the second opening portion is formed near a position at which the first opening portions are closest to each other.

(11) The rotor core according to (10), wherein the second opening portion has a shape that represents part of a side surface on the outer peripheral side of the first opening portion extended toward the outer peripheral side, the shape being formed such that a distribution of a thickness thereof with reference to the side surface of the first opening portion is offset toward the other magnet opening.

(12) The rotor core according to (10) or (11), wherein the second opening portions have side surfaces that face each other, extending in parallel with each other or being spaced farther away from each other toward the outer peripheral side.

(13) A rotor comprising:
a rotor core according to any one of (1) to (3); and
a permanent magnet inserted in the magnet openings the rotor core has.

(14) A rotating electric machine comprising:
the rotor according to claim 13; and
a stator disposed so as to face an outer peripheral surface of the rotor with an air gap defined therebetween.

(15) A rotor core comprising:
a pair of magnet openings disposed such that a space therebetween widens toward an outer peripheral side and in which two permanent magnets having a magnetic pole direction relative to a radial direction identical to each other are inserted, wherein
the magnet openings each have a shape that connects a first opening portion formed along a profile of the corresponding permanent magnet and a second opening portion that covers, when the permanent magnet is inserted in the first opening portion, a corner portion of the permanent magnet that is, out of corner portions of the permanent magnet, closest to the other permanent magnet with an air gap defined therebetween; and
the second opening portion forms a bridge portion between the second opening portion and the second opening portion of the other magnet opening.

(16) The rotor core according to (15), wherein the second opening portion is formed in size that generates magnetic saturation in the bridge portion.

(17) The rotor core according to (15) or (16), wherein each of both second opening portions is formed such that the side surfaces thereof that face each other extend in parallel with each other or are spaced farther away from each other toward the outer peripheral side.

(18) The rotor core according to any one of (15) to (17), wherein the second opening portions are formed such that a distance from a side surface of the permanent magnet on the outer peripheral side becomes greater toward the bridge portion.

(19) A rotor comprising:
a rotor core according to any one of (15) to (18); and
a permanent magnet inserted in the magnet openings the rotor core has.

(20) A rotating electric machine comprising:
the rotor according to (19); and
a stator disposed so as to face an outer peripheral surface of the rotor with an air gap defined therebetween.

What is claimed is:
1. A rotor core comprising:
a plurality of magnet openings formed in juxtaposition with each other in a circumferential direction and in which permanent magnets are inserted; and
cavity portions, each being formed relative to an area sandwiched between two magnet openings, out of the magnet openings, in which permanent magnets that are mutually adjacent and that have magnetic pole directions relative to a radial direction opposite to each other are inserted, wherein
the magnet openings include a pair of magnet openings disposed such that a space therebetween widens toward an outer peripheral side and in which two of the permanent magnets having a magnetic pole direction relative to a radial direction identical to each other are inserted;
each pair of the magnet openings has a shape that connects together a first opening portion formed along a profile of the corresponding permanent magnet and a second opening portion that forms, when the permanent magnet is inserted in the first opening portion, an air gap relative to the permanent magnet;
the second opening portions are formed near positions at which the first opening portions are closest to each other; and
the second opening portion has a shape that represents part of a side surface on the outer peripheral side of the first opening portion extended toward the outer peripheral side, the shape being finned such that a distribution of a thickness thereof with reference to the side surface of the first opening portion is offset toward the other magnet opening.

2. A rotor core comprising:

a plurality of magnet openings formed in juxtaposition with each other in a circumferential direction and in which permanent magnets are inserted; and cavity portions, each being formed relative to an area sandwiched between two magnet openings, out of the magnet openings, in which permanent ma nets that are mutually adjacent and that have magnetic pole directions relative to a radial direction opposite to each other are inserted, wherein the magnet openings include a pair of magnet openings disposed such that a space therebetween widens toward an outer peripheral side and in which the permanent magnets having a magnetic pole direction relative to a radial direction identical to each other are inserted;

each pair of the magnet openings has a shape that connects together a first opening portion formed along a profile of the corresponding permanent magnet and a second opening portion that, when the permanent magnet is inserted in the first opening portion, covers, out of corner portions of the permanent magnet, a corner portion closest to the other permanent magnet with an air gap defined therebetween; and the second opening portion forms a bridge portion between the second opening portion and the second opening portion of the other magnet opening.

3. The rotor core according to claim 2, wherein the second opening portion is formed in size that generates magnetic saturation in the bridge portion.

4. The rotor core according to claim 2, wherein each of both second opening portions is formed such that the side surfaces thereof that face each other extend in parallel with each other or are spaced farther away from each other toward the outer peripheral side.

5. The rotor core according to claim 2, wherein the second opening portions are formed such that a distance from a side surface of the permanent magnet on the outer peripheral side becomes greater toward the bridge portion.

6. A rotor comprising:

the rotor core according to claim 2; and a permanent magnet inserted in the magnet openings the rotor core has.

7. A rotating electric machine comprising:

the rotor according to claim 6; and a stator disposed so as to face an outer peripheral surface of the rotor with an air gap defined therebetween.

* * * * *